W. H. & J. Milliken,
Paper-Folder.
No. 3786. Reissued Jan. 4. 1870.
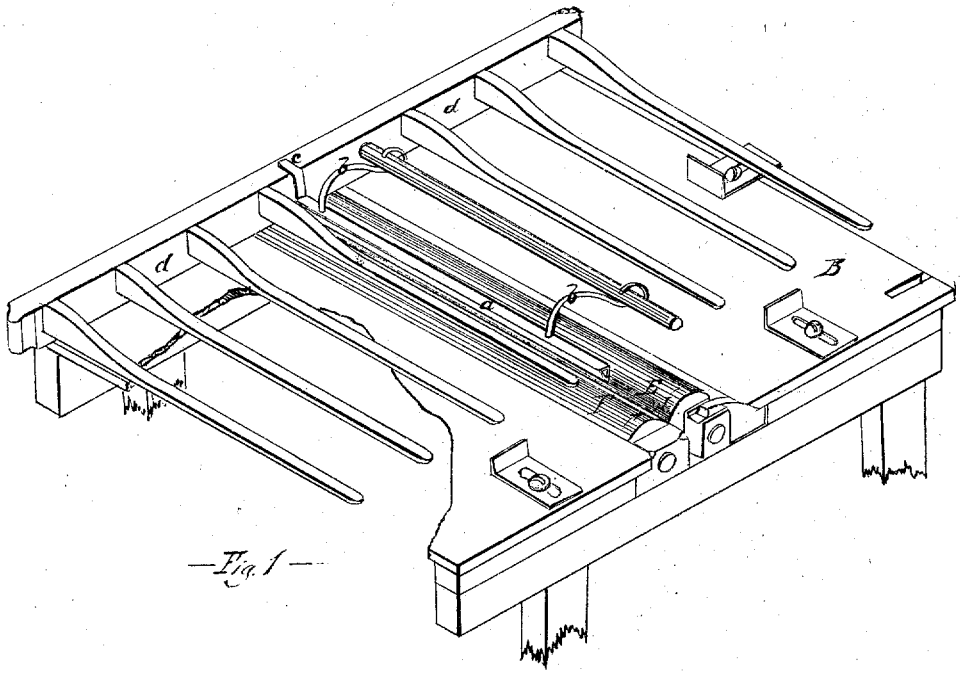
—Fig. 1—
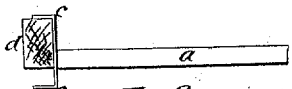
—Fig. 2—
Witnesses:
E. W. Griffin
W. H. Fuller
S. C. Forsaith agent
of W. & J. Milliken
By C. A. Dangin Atty
N. PETERS, PHOTO-LITHOGRAPHER, WASHINGTON, D. C.

United States Patent Office.

S. C. FORSAITH, OF MANCHESTER, NEW HAMPSHIRE, ASSIGNEE, BY MESNE ASSIGNMENTS, OF WILLIAM H. MILLIKEN AND JOHN MILLIKEN.

*Letters Patent No.* 31,578, *dated February* 26, 1861; *reissue No.* 3,786, *dated January* 4, 1870.

DIVISION B.

IMPROVEMENT IN COMBINING PAPER-FOLDING MACHINES WITH PRINTING-PRESSES.

The Schedule referred to in these Letters Patent and making part of the same.

*To all whom it may concern:*

Be it known that WILLIAM HENRY MILLIKEN and JOHN MILLIKEN, of Manchester, in the county of Hillsborough, and State of New Hampshire, did invent certain Improvements in Machines for Folding Sheets of Paper, of which the following is a full, clear, and exact description, reference being had to the accompanying drawings, figures, and letters of reference thereon, making part of this specification.

The drawing, figs. 1 and 2, represents the fly of a printing-press, with a folding-knife or blade attached thereto, and a table and folding-rollers, between which the sheet is doubled by the descent of the knife, and carried through the revolving rolls.

The object of this invention is to connect a folding-machine directly to a printing-press, so that sheets may be folded as fast as they issue from the press. To this end, The invention consists in making the connection or combination between a folding and a printing-machine, by means of a knife, or equivalent, attached to the fly of a printing-machine, as will be fully described hereafter.

To enable others skilled in the art to make and use this invention, the construction and operation thereof will be fully explained.

Figure 1 represents the fly of a printing-press, the central finger of which is replaced by a finger, *a*, which is hung, by means of arms *b b*, to one of the stationary fingers, or to a rod projecting from the back of the fly. The finger *a* is attached to a short bar, *c*, the ends of which are bent up at right angles, forming projections both above and below the back bar *d* of the fly; the distance between these bent ends or projections *c c* being greater than the width of the bar which they embrace, so that when the fly is up, receiving the sheet, the edge of the movable finger *a* is upon a level with the other finger.

When the fly falls, and lays the sheet upon the table, the finger, continuing to descend, strikes the paper between the rolls E E, and the fly immediately rises for another sheet.

This dropping-finger *a* is shown of triangular form, but any form of knife or blade may be used which will force the sheet between the folding-rollers as the fly descends.

What is claimed as the invention of W. H. MILLIKEN and J. MILLIKEN, is—

The combination, with the rolls E E of a folding-machine, of a knife, or the equivalent therefor, upon the fly of a printing-press, which shall enter the sheets to the rolls, whereby the two machines become co-operative, and the folding of the printed sheets is completed direct from the press, substantially as described.

S. C. FORSAITH.

Witnesses:

C. A. DURGIN,

EDWARD E. OSBORN.